March 27, 1945.   G. MAXON, JR   2,372,595
CONCRETE CONSISTENCY METER
Original Filed Aug. 6, 1941   3 Sheets-Sheet 1
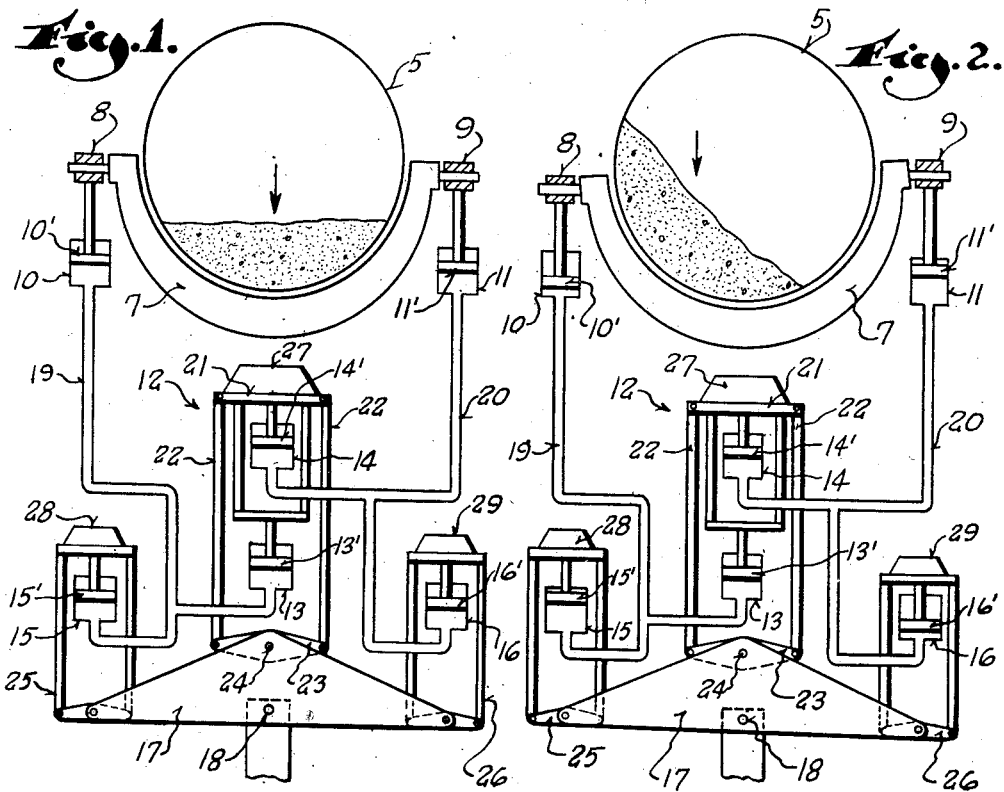
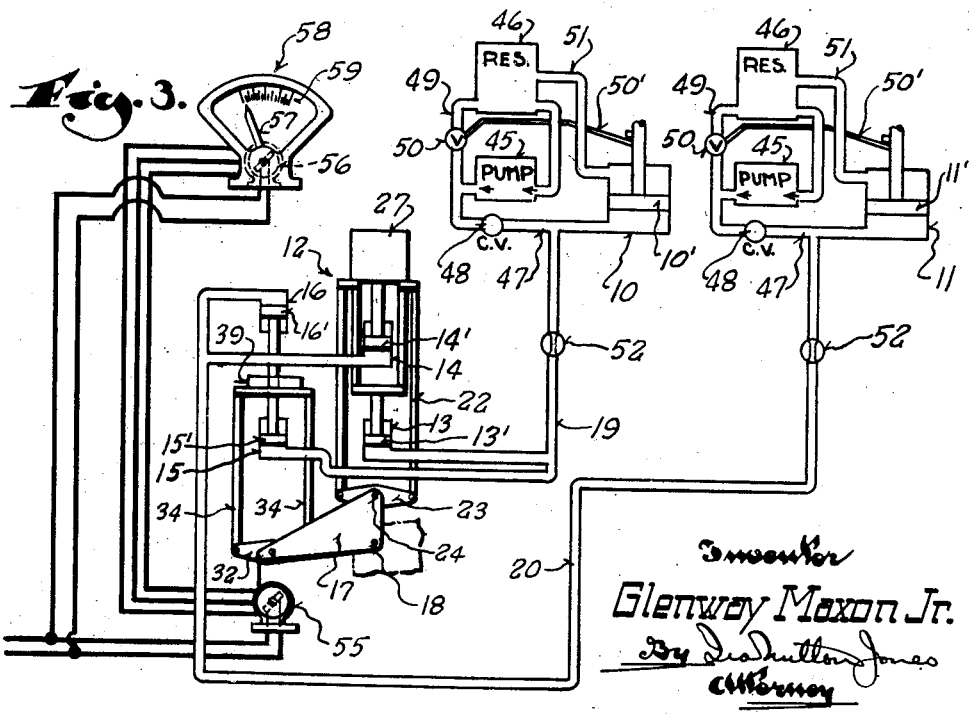
Inventor
Glenway Maxon Jr.

March 27, 1945.   G. MAXON, JR   2,372,595
CONCRETE CONSISTENCY METER
Original Filed Aug. 6, 1941   3 Sheets-Sheet 2

Inventor
Glenway Maxon Jr.

March 27, 1945. G. MAXON, JR 2,372,595
CONCRETE CONSISTENCY METER
Original Filed Aug. 6, 1941 3 Sheets-Sheet 3
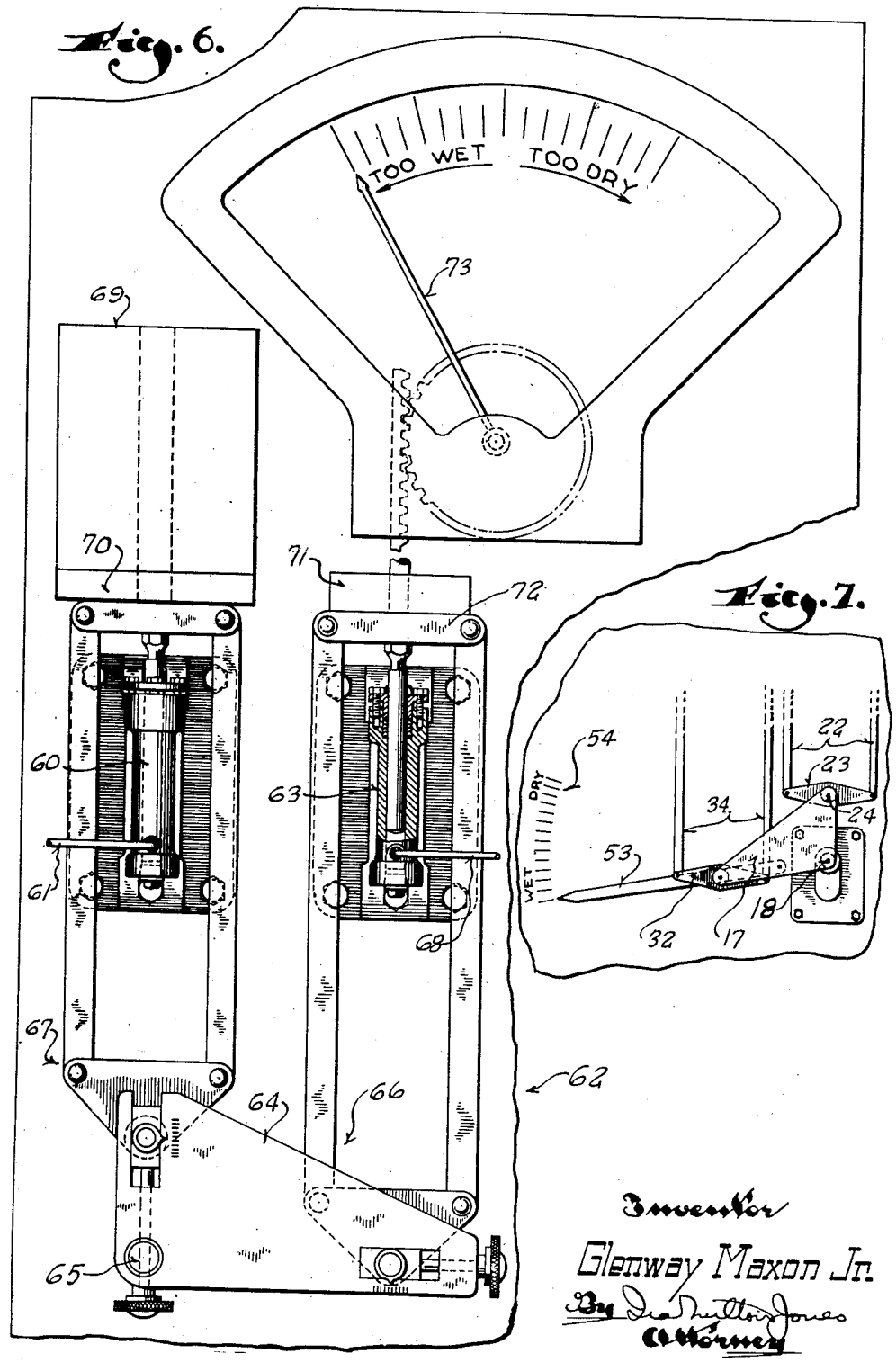
Inventor
Glenway Maxon Jr.

Patented Mar. 27, 1945

2,372,595

UNITED STATES PATENT OFFICE 2,372,595

CONCRETE CONSISTENCY METER

Glenway Maxon, Jr., Milwaukee, Wis., assignor to The T. L. Smith Company, Milwaukee, Wis., a corporation of Wisconsin Original application August 6, 1941, Serial No. 405,580. Divided and this application May 15, 1943, Serial No. 488,016

6 Claims. (Cl. 73—54)

This invention relates to hydraulic systems for translating force reactions into indicator motion as in the concrete consistency meter forming the subject matter of the copending application of Glenway Maxon, Jr., Serial No. 405,580, filed August 6, 1941, now Patent No. 2,342,749, granted February 29, 1944, of which this application is a division.

As described at length in said parent application the consistency of concrete and other semi-liquid mixtures can be determined from the shift in their center of gravity as they are being mixed in a rotating drum. This is accomplished by taking reactions at two spaced supports for the mixing drum and utilizing these reactions to produce two forces, one of which is obtained by means responsive to the weight of the batch as manifested in the reactions at said two supports, the other by means responsive to change in the location of the center of gravity as manifested in the reactions at the two supports. These two forces are then compared through suitable mechanism.

An expedient manner of translating the reactions into the two forces and comparing the forces to effect an indication is by means of the hydraulic system disclosed in said parent application and which constitutes the subject matter of this invention.

It is to be understood, however, that while the invention here presented grows out of the concrete consistency meter covered in the aforesaid parent application, it is not limited thereto, but rather contemplates the general utility of the system.

One of the objects of this invention thus resides in the provision of a hydraulic system for translating force reactions into indicator motion which is adapted for use with consistency meters for measuring the consistency of concrete and other semiliquid mixtures.

Another object of this invention is to provide a hydraulic system of the character described which is so designed and constructed as to insure utmost accuracy in the translation effected thereby.

To this end it is a further object of this invention to provide a mechanism which is sufficiently rugged to maintain accuracy in spite of the hard usage to which it may be subjected.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate several complete examples of the physical embodiment of the invention constructed in accordance with the best modes so far devised for the practical application of the principles thereof, and in which:

Figures 1 and 2 are similar diagrammatic views of a mixer apparatus having a rotatable mixing drum to illustrate the manner in which a shift in the location of the center of gravity of a batch being mixed is utilized through the hydraulic system of this invention to produce the motion necessary for effecting the desired consistency indication;

Figure 3 is a diagrammatic view of the complete system;

Figure 6 is an enlarged detail view illustrating the instrumentalities of a modified indicating mechanism for use in a system slightly different in application but the same in principle; and Figure 7 is a fragmentary detail view illustrating the manner in which the motion produced as a result of a shift in the center of gravity may be employed directly to effect the desired indication.

Figure 4:
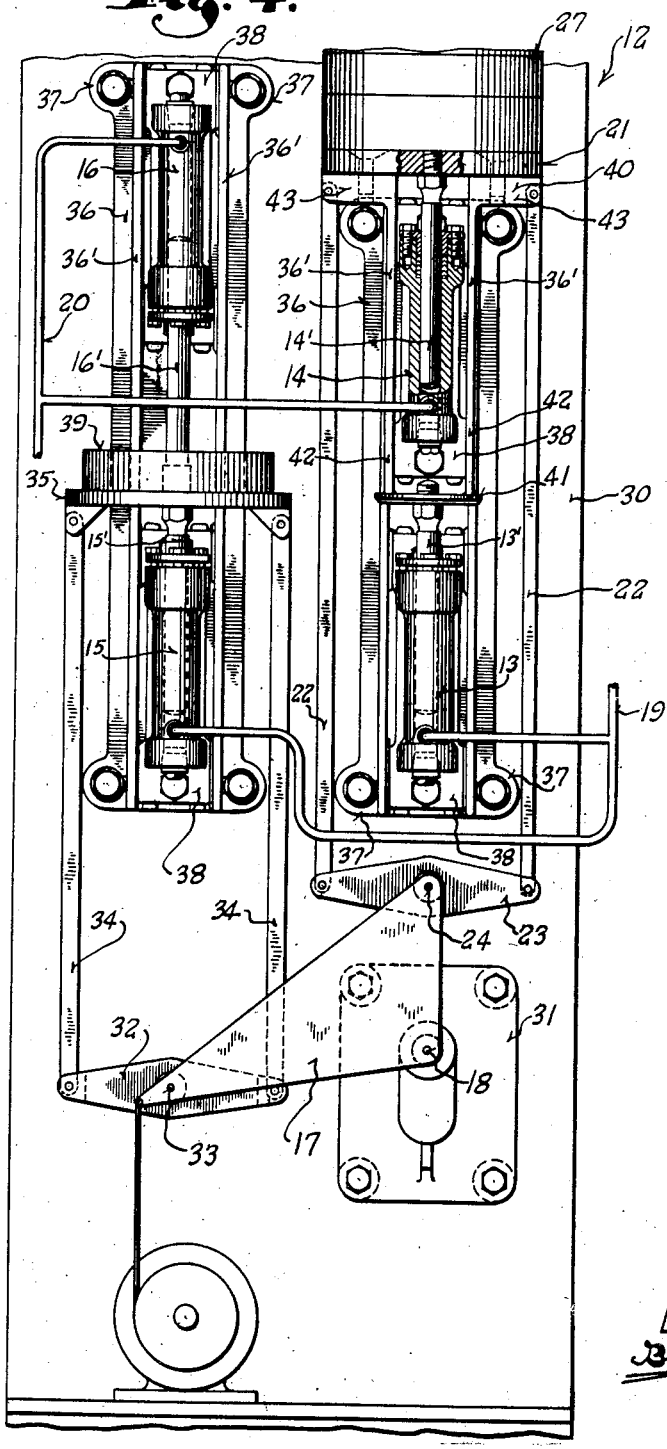
Figure 4 is an enlarged front plan view of the instrument or mechanism of the system at which the motion necessary to effect the desired indication is produced.

Although the invention here presented is not concerned solely with concrete consistency measurement but covers the system and apparatus disclosed in the aforesaid parent application for general utility, for the sake of clarity it will be well to define the invention with relation to the consistency meter of the parent application.

In general terms the application of the invention to a concrete consistency meter consists in supporting the trunnions of the cradle in which the drum of a tilting mixer is suspended with its axis normal to the axis of the cradle trunnions, by means of hydraulic cylinders of the same size.

The reaction in each cylinder is thus directly proportional to the weight or load on the trunnion supported thereby. If the center of gravity of the drum and cradle structure shifts due to lateral shifting of the batch in the drum, the proportion of the weight or load carried by the two trunnions and consequently the reaction in their cylinders changes correspondingly. This change in reaction thus can be utilized to ascertain change in the center of gravity.

The location of the center of gravity of a batch being mixed in the drum (with relation to the loads on the two cradle trunnions) depends upon the lateral position of the batch in the drum, and this depends upon the consistency of the batch. During mixing the batch is shifted laterally due to the tendency of the mixing action to cause the batch to follow the ascending side of the drum. This, consequently, shifts the load in the drum and carries its center of gravity away from one cradle trunnion and toward the other to an extent depending upon the consistency of the batch.

A wet, relatively fluid batch obviously will not be carried laterally as far as a dry, stiffer batch. A shift in the center of gravity of the batch less than a predetermined amount which represents the desired consistency would thus indicate a condition of excess wetness, while a shift in the center of gravity beyond the amount which represents the desired consistency would indicate a too dry condition of the batch.

The change in reaction in the hydraulic cylinders due to the shift in the center of gravity of the drum load thus may be utilized to determine and measure the consistency of the batch being mixed.

Through suitable mechanism these changes in reaction in the hydraulic cylinders are indicated to the operator on an appropriate gauge or scale so that the operator is at all times cognizant of the condition of the batch in the drum. Hence, if the batch is too dry or too wet he can effect the necessary correction before dumping the batch.

Through careful weighing of the aggregates, an effort is made to adhere as closely as possible to a desired consistency but as is well known to those skilled in the art, there are many conditions which affect the consistency of concrete and mere weighing of the aggregates before charging the drum will not insure the maintenance of any desired consistency.

Hence, this invention when applied to a concrete consistency meter is of great value to the operator as it enables him to make corrections even while the batch is being mixed, so that all of the concrete delivered will meet the specifications.

As stated, it is the reaction in the hydraulic cylinders which support the cradle trunnions that is used to effect the desired indication. The manner in which this is accomplished perhaps will be best understood from the diagrammatic disclosures of Figures 1 and 2. As illustrated in these diagrammatic disclosures the conventional tilting mixer has its mixing drum 5 rotatably carried by a cradle 7. The opposite ends of this cradle have trunnions 8 and 9 by which the cradle is supported between pedestals (not shown) on hydraulic cylinders 10 and 11, respectively, mounted on the pedestals.

The structural features of the mixer, the manner in which the drum is driven and the cradle is tilted form no part of this invention and thus have not been shown.

The cylinders 10 and 11 which support the trunnions of the cradle are identical in size and construction. They are fixed to their respective pedestals and have pistons 10' and 11' reciprocable therein. The connecting rods or rams of the pistons pass through packing glands at the top of the cylinders and are connected to the trunnions 8 and 9 to support the same.

Hence, it is evident that fluid in the cylinders under the pistons will be placed under pressure the extent of which depends upon the weight or load on the trunnions.

Inasmuch as the disclosures of Figures 1 and 2 are purely diagrammatic certain elements of the indicating mechanism are illustrated therein in simplified form, and others are omitted entirely.

The reactions in the cylinders 10 and 11 are duplicated in a mechanism indicated generally by the numeral 12 and which may be referred to as a pantograph board inasmuch as the reactions at the cylinders 10 and 11 due to the weight of the batch and the shift of its center of gravity are reflected in miniature in this mechanism.

The essential elements of the pantograph mechanism are two small hydraulic cylinders 13 and 14, the pistons 13' and 14', respectively, of which both react upwardly in consequence to the weight of the drum contents as will appear hereinafter; and two other miniature cylinders 15 and 16, the pistons 15' and 16', respectively, of which react to the weight respectively carried by the trunnions 8 and 9, and in a manner to be hereinafter described effect rocking motion of a lever member 17 about a fixed pivot 18.

It is the movement of this lever member 17 which provides the motion for the indicator mechanism by which the location of the center of gravity and any shift therein and consequently the consistency of the batch is visually indicated.

As stated, the cylinders on the pantograph board are of miniature proportions as compared to the hydraulic cylinders 10 and 11. In actual practice, these cylinders are five-eighths of an inch in diameter, while the cylinders 10 and 11 are six or seven inches in diameter.

The pressure sides of the cylinders 10 and 11 are connected to the miniature cylinders on the pantograph board through suitable tubing. One line 19 connects the pressure side of the cylinder 10 with the miniature cylinders 13 and 15, while a line 20 connects the pressure side of the cylinder 11 with the miniature cylinders 14 and 16.

The pistons 13' and 14' of the miniature cylinders 13 and 14 both react upwardly against a counterweight platform 21.

This counterweight platform is connected through tugs or harness straps 22 with a whiffletree 23 pivoted as at 24 to the lever member 17. Hence, an upward pull on the tugs 22, unless opposed, pulls the lever member 17 to the position shown in Figure 1 at which the whiffletree hitch 24 is in vertical alignment with the fixed pivot 18.

Attention is directed to the fact that the pistons 13' and 14' are exactly coaxial and are constrained to vertical motion on a line passing through the fixed pivot 18.

The pistons 15' and 16' in the miniature cylinders 15 and 16 are connected to the opposite ends of the lever member 17 by tug and whiffletree connections 25 and 26, respectively, so that an upward force on these pistons acts on the lever member 17 in a manner tending to impose a turning moment thereon, but inasmuch as their forces are applied on opposite sides of the fixed pivot 18 movement of the lever member depends upon a differential in the forces acting on the pistons 15' and 16'.

Inasmuch as only the live load, i. e., the weight of the batch, and the shift in its center of gravity constitutes the basis for the consistency meascoaxiality is assured between the cylinders of each pair.

As noted hereinbefore, the tug and whiffletree connection between the lever member 17 and the connected rams of the cylinders 15 and 16 are attached to a crosspiece 35 which serves as a platform for the counterweight 39 necessary to cancel out the differential in dead load on the trunnions 8 and 9.

The counterweight platform 21 which supports the counterweight 27 is in the form of a disc having the piston rod or ram 14' of the cylinder 14 threaded therein. This disc 21 is also secured by means of screws or other fastenings to the upper end of a yoke 40 by which it is connected to the piston rod or ram 13' of the cylinder 13.

Specifically, the yoke 40 consists of a disc 41 in which the piston rod or ram 13' is threaded and two spaced parallel arms 42 which extend up alongside the cylinder and carry lateral extensions 43 on their upper ends into which the screws or other fastenings serving to hold the platform 21 to the yoke are threaded.

The hydraulic cylinders 10 and 11 and the miniature cylinders on the pantograph board have been defined as being connected by pipe lines 19 and 20 and in the description thus far it has been assumed that the system was maintained filled with liquid, specifically oil.

To insure maintaining the fluid system full and to replenish loss which may occur past the pistons, suitable make-up apparatus is provided. This apparatus may consist of a pump 45 and a reservoir 46 connected with each of the main cylinders 10 and 11. As clearly shown in Figure 3, the outlet of each pump is connected with its respective main cylinder through a suitable feed line 47 in which a check valve 48 is incorporated, and with the reservoir by means of a return line 49 having a control valve 50 inserted therein.

The upper side of each of the main cylinders is also connected to the reservoir through a return line 51. It is to be understood, however, that the fluid in this line 51 is not under pressure.

The operation of the make-up apparatus may be manual but is preferably automatic. One manner of effecting the desired automatic operation of the apparatus is by means of a mechanical or other connection (indicated by the numeral 50' in Figure 3) between the bearing block of each trunnion or a part movable therewith and its associated control valve 50. Through these connections the valves 50 are closed whenever the bearing blocks descend beyond a predetermined limit. Hence, loss of oil in the fluid system and under the pistons 10' or 11' will effect closure of the valve 50 so that the constantly operating pump will force oil past the check valve 48 into the system.

To iron out vibrations and momentary shocks caused by the shaking of the supporting frame of the mixer due to loading or discharging an adjacent machine or any other vibration producing disturbance, each of the pressure lines 19 and 20 has a needle valve 52 or other suitable constriction or choke incorporated therein.

The vibration of the mixer, however, does have a beneficial value as it insures response of the pistons of the miniature cylinders on the pantograph board, notwithstanding the closeness of their fit.

The manner in which a shift in the location of the center of gravity of the batch in the drum effects rocking motion of the lever member 17 has been described. It has also been noted that it is the movement of this lever member which produces the motion required to effect the desired indication. This movement may be utilized directly as shown in Figure 7 by merely attaching a pointer 53 to the lever member 17 to be moved across a scale 54 calibrated to afford an indication of the consistency of the batch.

Better results, however, are obtained by translating the motion of the lever member 17 by means of self-synchronous electrical motion transmitting devices such as Selsyn motors into the desired indicator movement, and in Figure 3 the application of this form of motion transmission is illustrated.

In this instance, the outer end of the lever member 17 is connected mechanically to the rotor of a Selsyn transmitter 55 which is connected electrically with a Selsyn receiver 56. The receiver operates the pointer 57 of a gauge indicated generally by the numeral 58 and including a scale 59 with which the pointer cooperates.

The consistency meter thus far described has been applied to the tilting type of concrete mixer. The invention is, of course, also susceptible for use with the non-tilting type of mixer such as used on pavers.

In this case, as defined in the parent application, one end of the cradle has a fixed pivotal support while its other end is supported by a hydraulic cylinder. This cylinder, like the cylinders 10 and 11, is pivoted to the supporting base, while its ram or piston rod connects with the free end of the cradle so that a load on the cradle applies pressure on the fluid in the cylinder.

A load on the piston of the cylinder is thus manifested by an upward reaction in a miniature cylinder 60 with which the cylinder is connected through a suitable pipe line 61.

The miniature cylinder 60 forms part of a pantograph mechanism indicated generally by the numeral 62 and which in addition to the cylinder 60 includes another similar cylinder 63 and a lever member 64 pivoted to the panel board of the mechanism as at 65 which point is in line with the axis of the cylinder 60.

The lever member 64 is of triangular formation as previously described, and the ram or piston of the cylinder 63 is tied to the outer end of the lever member through a tug and whiffletree connection 66, while the piston or ram of the cylinder 60 is tied to the upper end of the lever member through a tug and whiffletree connection 67.

The miniature cylinder 63 is connected with a reaction cylinder (not shown) through a pipe line 68 so that pressure in the latter cylinder effects an upward reaction in the cylinder 63. The manner in which the reaction cylinder is mounted so that the reaction therein is proportional to the torque load on the drive pinion of the mixer forms no part of the invention covered here. It is adequately illustrated and described in the parent application. For the purposes of this invention it is sufficient to note that, as in the previously described embodiment of the invention, the dead weight and the friction load are cancelled out in their effect at the pantograph board. To this end a weight 69 is carried on a counterweight platform 70 supported by the piston of the cylinder 60, and a weight 71 is carried on a platform 72 supported by the piston of the cylinder 63.

The pantograph lever member 64 is thus left undisturbed and the pointer 73 which is conurement, the effect of the dead weight of the drum, its cradle and associated mechanism should be cancelled out. This is conveniently accomplished by a weight 27 on the counterbalance platform 21 which balances the weight of the empty drum, its cradle and associated mechanism. The effect of the dead load on the pistons 15' and 16' is also subtracted or cancelled out by counterweights 28 and 29 supported by the pistons 15' and 16', respectively.

In the purely diagrammatic and illustrative showing of Figures 1 and 2 the load on the trunnions 8 and 9 is equal, hence the counterweights 28 and 29 are each one-half of the counterweight 27 which balances the total dead weight.

In actual practice, however, the drive motor and its associated transmission (not shown) being located adjacent to one of the two trunnions it follows that the load on the two trunnions is not the same. Hence, the counterweights 28 and 29 would be proportionately different. Moreover, as will appear hereinafter, in the actual pantograph mechanism the cylinders 15 and 16 are coaxial and their pistons are connected and oppose each other. The counterweight required, therefore, need be only the difference between the actual counterweights needed at 28 and 29 if the system were as shown in Figures 1 and 2.

If now the drum is charged with a batch of aggregates as shown in Figure 1 but with the drum stationary (that is, not revolving), an upward force on all of the pistons of the pantograph mechanism manifests the addition of this load on the trunnions. However, as the proportion of the load carried by the two trunnions has not changed, no action occurs. A pull is merely exerted on the lever member 17 by the tug and whiffletree connection 22—23 proportional to the weight of the batch and one-half this pull is exerted on each of the opposite ends of the lever member by the tug and whiffletree connections 25 and 26.

When the drum revolves and the mass is carried laterally over toward the ascending side of the drum as shown in Figure 2, the center of gravity of the mass shifts to the left as indicated and as a consequence the load on the trunnion 8 is proportionately greater than the load on the trunnion 9.

The sum of the loads on the trunnions, however, remains the same. The pull exerted on the lever member 17 as a result of the upward reactions of the pistons 13' and 14' thus is not altered, for while the pressure in the line 19 and under the piston 13' has been increased, the pressure in the line 20 and under the piston 14' has been decreased by a like amount.

A different effect is produced at the cylinders 15 and 16 by this difference in fluid pressure in the lines 19 and 20. Here the increased pressure in the line 19 and the corresponding decrease in the line 20 exerts a greater upward pull on the left hand end of the lever member 17 than on the right hand end and as a result the lever member 17 rocks on its fixed pivot 18 until the turning moment imposed upon the lever member 17 by the response in the cylinders 15 and 16 is balanced by the turning moment imparted to the lever member 17 by the pull on the whiffletree connection 24 which, at this time is to the right of the vertical axis of the cylinders 13 and 14 and hence has a turning moment effective on the lever member.

To illustrate, consider that the upward pull on point 24 as a result of the sum of the reactions in cylinders 13 and 14 due to concrete in the drum is one hundred pounds, and that the pull on the whiffletree 25 is fifty-five pounds while the pull on the whiffletree 26 is forty-five pounds because of the shift in center of gravity. These forces acting on the lever member will cause it to rock clockwise on its fixed pivot 18 until the turning moment on the lever member due to the ten pound differential between the pulls acting on the opposite ends thereof balances the turning moment applied on the lever member by the one hundred pound pull applied at point 24.

Assuming that the batch in the drum is of the proper consistency, the position which the lever member 17 assumes at this time can be utilized to indicate zero or desired consistency on a suitable indicator or gauge so that a shift in the position of the center of gravity due to either wetter or drier consistency will be reflected by motion of the lever member 17 about its pivot 18 in one direction or the other; and this motion properly translated to a pointer on a scale or other indicating medium will indicate the variation from the desired consistency and enable the operator to make the necessary correction.

As noted hereinbefore the disclosures of Figures 1 and 2 are purely diagrammatic and are intended only to illustrate the manner in which the forces operate in the system to bring about the desired indication of the shift in the center of gravity. In actual practice, the pantograph board and particularly the lever member 17 and the relationship of the cylinders 15 and 16 is different from that shown in Figures 1 and 2.

Figure 5:
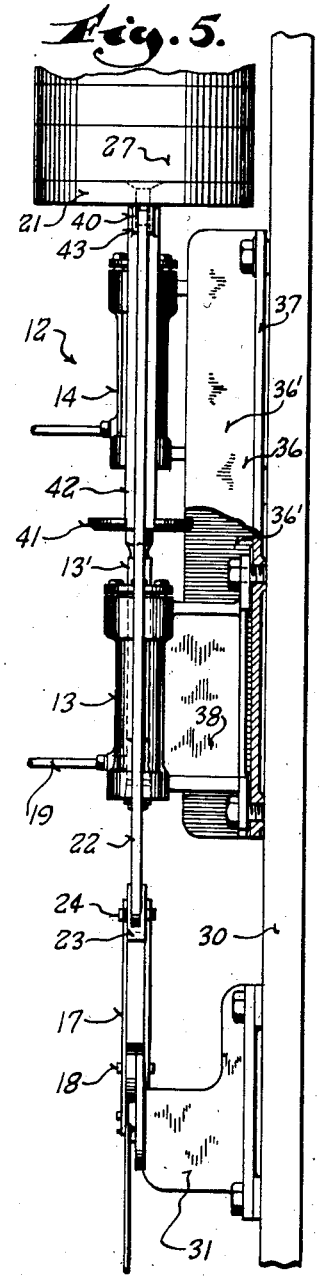
Figure 5 is a side view of the mechanism shown in Figure 4.

The actual construction of the pantograph board is as illustrated in Figures 4 and 5. It consists of a supporting panel 30 which may be secured to any suitable support adjacent to the mixer. Being so disposed, the panel 30 is subjected to the vibration of the mixer which has a beneficial effect as will be hereinafter noted.

Secured to the panel 30 is a bracket 31 which supports the fixed pivot 18 on which the lever member 17 is pivoted. The lever member 17, however, instead of extending to opposite sides of the pivot 18 as in Figures 1 and 2 is of triangular or bell crank formation with one arm substantially horizontal and the other vertical. The upper or outer end of the vertical arm has the whiffletree 23 pivoted thereto at the point 24. The outer end of the horizontal arm has the effect of the differential in reaction in the cylinders 15 and 16 applied thereto by means of a whiffletree 32 pivoted to the lever member at 33 and tugs 34 which connect the whiffletree with a cross piece 35 which also serves as a counterweight platform. The cross piece 35 is fixed to the pistons or rams of the cylinders 15 and 16 which are opposed.

Inasmuch as it is essential that both sets of cylinders 13 and 14, and 15 and 16, are securely held in exact coaxiality, a special mounting bracket 36 is provided for each set of cylinders. These brackets are in the nature of channels having spaced flanges 36' between which the cylinders are positioned. Outwardly extending attaching flanges 37 on the channels enable the brackets to be bolted to the panel 30. Suitable pads are formed on the inner surfaces of the flanges 36' and on the bottom of the channel to enable accurate machining and insure properly located seats for the attaching portions or brackets 38 of the cylinders.

In this manner a simple and very rigid mounting is provided for the cylinders by which absolute nected with the piston of the cylinder 63 remains off the scale.

When the drum is loaded and the mixer is in operation the indication afforded by the pointer 73 will follow changes in the location of the center of gravity of the batch.

Inasmuch as this form of the invention is designed with a view toward its incorporation in pavers which very often are operated on an incline, means are provided for adjusting the pantograph mechanism to compensate for errors which would otherwise exist because of the angles involved. To this end the tug and whiffletrees by which the pistons or rams of the miniature cylinders are connected with the lever member are provided with adjustments as clearly shown in Figure 6. By virtue of these adjustments the points of force application to the pantograph lever may be adjusted toward and from its fixed pivot 65.

From the foregoing description, taken in the connection with the accompanying drawings, it will be readily apparent to those skilled in the art that this invention provides a hydraulic control apparatus especially well adapted for use with concrete consistency meters in that it provides a reliably accurate manner of translating changes in force reactions due to a shift in the center of gravity of the batch into indicator motion.

What I claim as my invention is:

1. In an apparatus of the character described: two load responsive means for producing fluid pressure; and a fluid pressure actuated means responsive to said fluid pressure for effecting an indication of the ratio of the loads on said two load responsive means comprising, a pair of hydraulic cylinders having their movable elements acting in the same direction under pressure in the cylinders; means connecting their movable elements so that the forces of said movable elements are added; a lever member; a fixed pivot for the lever member; a connection between said connected movable elements of the cylinders and the lever member at a point spaced from the pivot of the lever member; another pair of hydraulic cylinders having their movable elements connected with the lever member in a manner such that the forces they apply on the lever member are opposed so that a differential in said forces produces a turning moment on the lever member to rock the lever member on its pivot until said turning moment produced by said differential in forces equals the turning moment placed on the lever member by the sum of the forces of the movable elements of the first mentioned pair of cylinders; and indicator means driven by the lever member.

2. In an apparatus of the character described: a stationary support; a lever member pivoted on said support; a pair of hydraulic cylinders each having fixed and movable elements; means mounting said cylinders with their axes coaxial and with their movable elements acting in the same direction under pressure in the cylinders; means connecting said movable elements of the cylinders to each other and with the lever member at a point spaced from its pivot so that the sum of the forces of said movable elements is capable of imparting a turning moment on the lever member; another pair of hydraulic cylinders each having fixed and movable elements; means mounting said other pair of hydraulic cylinders with their axes coaxial and with their movable elements acting in opposite directions under influence of pressure in the cylinders; means connecting the movable elements of said other cylinders so that their forces oppose each other; and means connecting the connected movable elements of said other cylinders with the lever member at another point so that a differential in pressure in said other cylinders applies a turning moment on the lever member to oppose any turning moment produced by the forces of the movable elements of said first mentioned cylinders.

3. In an apparatus of the character described: a stationary support; a lever member pivoted thereon; a pair of hydraulic cylinders having pistons movable therein; means mounting said cylinders on the stationary support, the pistons of both cylinders acting in the same direction under influence of pressure in the cylinders; a connection between both of said pistons and a point on the lever member spaced from its pivot so that said pistons may impose a turning moment on the lever member; a second pair of hydraulic cylinders having pistons movable therein; means mounting said second pair of hydraulic cylinders on the stationary support with their pistons acting in opposite directions under influence of pressure in said second cylinders; and means for connecting both of the pistons of said second cylinders with another point on the lever member spaced from its pivot so that the turning moment imposed on the lever member by the pistons of said second pair of hydraulic cylinders in consequence to a differential in pressure in said cylinders opposes the turning moment imposed on the lever member by the pistons of the first named cylinders.

4. The apparatus defined in claim 1 characterized by the fact that the two load responsive means have large pressure applying areas while all of the movable elements of the hydraulic cylinders have small pressure applying areas.

5. In an apparatus of the character described: a stationary support; a lever member pivoted thereon; an indicator operable by the rocking motion of the lever member; a hydraulic cylinder fixed on the support, said cylinder having a piston movable therein; a whiffletree pivoted to the lever member at a point spaced from its pivot; tugs connecting the whiffletree with the piston of said cylinder so that the force of the piston in response to pressure in the cylinder is transmitted to the lever member to impose a turning moment thereon whenever the line of force is out of line with the pivot of the lever member; a second hydraulic cylinder mounted on the support, said second cylinder having a piston movable therein; a second whiffletree pivoted to the lever member at another point thereon spaced from its pivot; and tugs connecting said second whiffletree with the piston of said second cylinder so that the force of the piston in said second cylinder in response to pressure in the cylinder is transmitted to the lever member to impose a turning moment on the lever member in opposition to the aforesaid turning moment.

6. Means for indicating the ratio of the loads imposed by the shifting contents of a receptacle on two supports for the receptacle, comprising: a load responsive means interposed between each of the supports and the receptacle; a lever member pivoted to rock about a fixed point; an indicator operable by the rocking motion of the lever member; a stationary cylinder mounted so as to be subjected to the vibration produced by the shifting of the receptacle contents; a close fitting piston slidable in the cylinder; means connecting the piston with the lever member so that the force of said piston is transmitted to the lever member and imposes a turning moment thereon whenever the line of force is out of line with the pivot for the lever member; a second cylinder mounted so as to be subjected to the vibration produced by the shifting of the receptacle contents; a close fitting piston slidable in said second cylinder; means connecting said piston of the second cylinder with another point on the lever member spaced from its pivot so that the force of said piston of the second cylinder imposes a turning moment on the lever member in opposition to the aforesaid turning moment; and duct means connecting each cylinder with one load responsive means so that fluid in said load responsive means, cylinders and duct means transmits pressure imposed on the load responsive means to the pistons of the two cylinders, the vibration caused by the shifting receptacle contents insuring response of the pistons to changes in fluid pressure notwithstanding the closeness of their fit in the cylinders.

GLENWAY MAXON, Jr.